US011125275B2

(12) United States Patent
Nalamwar et al.

(10) Patent No.: US 11,125,275 B2
(45) Date of Patent: Sep. 21, 2021

(54) BEARING ASSEMBLY FOR A FAN OF AN HVAC SYSTEM

(71) Applicant: Johnson Controls Technology Company, Auburn Hills, MI (US)

(72) Inventors: Pankaj D. Nalamwar, Digras (IN); Dnyaneshwar G. Rokade, Pune (IN); Rammohan Sethuraj, Tuticorin (IN); Karan Garg, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 98 days.

(21) Appl. No.: 16/247,355

(22) Filed: Jan. 14, 2019

(65) Prior Publication Data

US 2020/0224724 A1    Jul. 16, 2020

Related U.S. Application Data

(60) Provisional application No. 62/790,943, filed on Jan. 10, 2019.

(51) Int. Cl.
| | |
|---|---|
| *F16C 35/06* | (2006.01) |
| *F16C 19/14* | (2006.01) |
| *F25B 13/00* | (2006.01) |
| *F25B 39/04* | (2006.01) |
| *F25D 17/06* | (2006.01) |
| *B23P 15/26* | (2006.01) |

(52) U.S. Cl.
CPC .............. *F16C 35/06* (2013.01); *B23P 15/26* (2013.01); *F16C 19/14* (2013.01); *F25B 13/00* (2013.01); *F25B 39/04* (2013.01); *F25D 17/067* (2013.01); *F16C 2360/46* (2013.01)

(58) Field of Classification Search
CPC ...... F16C 19/14; F16C 35/06; F16C 2360/46; F16C 35/077; F16C 33/586; F16C 2226/76; F25B 13/00; F25B 39/04; F25D 17/067; B23P 15/26
USPC .......................................... 417/36
See application file for complete search history.

(56) References Cited

U.S. PATENT DOCUMENTS

| | | | |
|---|---|---|---|
| 6,619,036 | B2 | 9/2003 | Kawamoto et al. |
| 6,796,367 | B2 | 9/2004 | Blacquiere et al. |
| 7,250,017 | B2 | 7/2007 | Asa et al. |
| 7,675,204 | B2 | 3/2010 | Lee et al. |
| 7,832,536 | B2 | 11/2010 | Maeda et al. |
| 8,506,437 | B2 | 8/2013 | Cheung et al. |

(Continued)

FOREIGN PATENT DOCUMENTS

EP    1191197 B1    12/2006

*Primary Examiner* — Connor J Tremarche
(74) *Attorney, Agent, or Firm* — Fletcher Yoder, P.C.

(57) ABSTRACT

The present disclosure relates to a heating, ventilation, and/or air conditioning (HVAC) unit including a condenser coil and a condenser fan assembly. The condenser fan assembly includes a first fan and a second fan, where the first fan and the second fan are each configured to operate to pull air through the condenser coil. The HVAC unit also includes a motor of the first fan including a housing and a shaft, where the motor is configured to operate to rotate the shaft in a first direction. The HVAC unit further includes a unidirectional bearing that is coupled to the shaft and a mounting assembly of the condenser fan assembly, where the unidirectional bearing is configured to block rotation of the shaft in a second direction that is opposite the first direction.

11 Claims, 14 Drawing Sheets

(56) References Cited

U.S. PATENT DOCUMENTS

| | | | |
|---|---|---|---|
| 2003/0129065 A1* | 7/2003 | Hu | F04B 35/06 |
| | | | 417/234 |
| 2006/0254309 A1 | 11/2006 | Takeuchi et al. | |
| 2010/0143169 A1 | 6/2010 | Fernandes | |
| 2010/0193163 A1* | 8/2010 | Rollins | F04D 25/06 |
| | | | 165/121 |
| 2011/0113795 A1* | 5/2011 | Montminy | F24F 1/022 |
| | | | 62/77 |
| 2015/0130314 A1* | 5/2015 | Collins | H02K 5/00 |
| | | | 310/91 |
| 2015/0180401 A1* | 6/2015 | Chretien | H02P 21/02 |
| | | | 318/490 |
| 2015/0267948 A1 | 9/2015 | Taylor et al. | |
| 2016/0087505 A1* | 3/2016 | Turner | H02K 5/1735 |
| | | | 310/90 |

\* cited by examiner

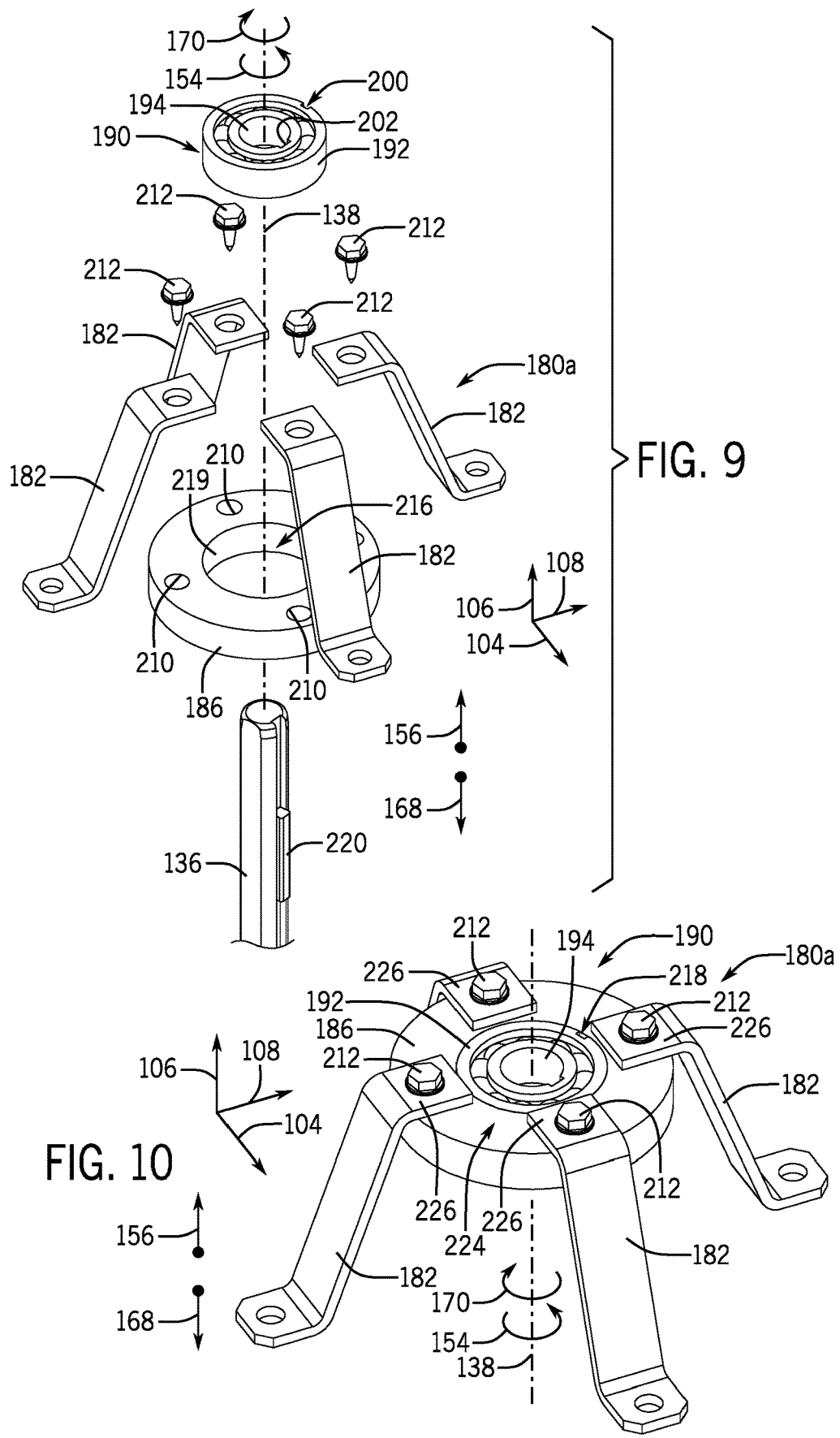

BEARING ASSEMBLY FOR A FAN OF AN HVAC SYSTEM

CROSS-REFERENCE TO RELATED APPLICATIONS

This application claims priority from and the benefit of U.S. Provisional Application Ser. No. 62/790,943, entitled "BEARING ASSEMBLY FOR A FAN OF AN HVAC SYSTEM," filed Jan. 10, 2019, which is herein incorporated by reference in its entirety for all purposes.

BACKGROUND

This disclosure relates generally to heating, ventilation, and/or air conditioning (HVAC) systems. Specifically, the present disclosure relates to a bearing assembly for a fan of an HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

A heating, ventilation, and/or air conditioning (HVAC) system may be used to thermally regulate an environment, such as a building, home, or other structure. The HVAC system generally includes a vapor compression system having heat exchangers, such as a condenser and an evaporator, which cooperate to transfer thermal energy between the HVAC system and the environment. Particularly, a compressor may be used to circulate a refrigerant through the vapor compression system and enable the transfer of thermal energy between the condenser and the evaporator. In many cases, a condenser fan assembly is coupled to the condenser and is configured to enhance a heat transfer rate between refrigerant circulating through the condenser and an ambient environment, such as the atmosphere. For example, the condenser fan assembly may include a plurality of condenser fans that are configured to draw or force an air flow across the condenser. Accordingly, the air traversing the condenser may absorb thermal energy from the refrigerant flowing therein before the refrigerant is recirculated to, for example, the evaporator of the vapor compression system.

In some cases, one or more of the condenser fans may be deactivated during certain operational periods of the HVAC system, such as when an ambient outdoor temperature is relatively low. As a result, condenser fans remaining operational during these certain operational periods may draw a backflow of air across the non-operational fans. In many cases, this backflow of air may induce rotation of the inactive fans and promote the generation of air vortices between active condenser fans and inactive condenser fans. Unfortunately, such air vortices may decrease an effectiveness of the operational condenser fans and thereby reduce an overall operational efficiency of the HVAC system.

SUMMARY

The present disclosure relates to a heating, ventilation, and/or air conditioning (HVAC) unit including a condenser coil and a condenser fan assembly. The condenser fan assembly includes a first fan and a second fan, where the first fan and the second fan are each configured to operate to pull air through the condenser coil. The HVAC unit also includes a motor of the first fan including a housing and a shaft, where the motor is configured to operate to rotate the shaft in a first direction. The HVAC unit further includes a unidirectional bearing that is coupled to the shaft and a mounting assembly of the condenser fan assembly, where the unidirectional bearing is configured to block rotation of the shaft in a second direction that is opposite the first direction.

The present disclosure also relates to a fan assembly for a heating, ventilation, and/or air conditioning (HVAC) unit. The fan assembly includes a motor having a housing and a shaft, where the shaft extends out of the housing and the motor is operable to drive rotation of the shaft. The fan assembly also includes a unidirectional bearing that is coupled to the shaft external to the housing and is configured to couple to a mounting assembly of the HVAC unit. The fan assembly further includes a fan blade that is coupled to the shaft, where the unidirectional bearing and the fan blade are offset from one another along the shaft.

The present disclosure also relates to a retro-fit kit for a condenser fan assembly of a heating, ventilation, and/or air conditioning (HVAC) unit. The retro-fit kit includes a unidirectional bearing that is configured to couple to a shaft extending from a housing of a motor that is configured to drive rotation of a condenser fan blade. The retro-fit kit also includes a bearing mount that is configured to couple to the unidirectional bearing and to position the unidirectional bearing along the shaft and external to the housing. The retro-fit kit further includes a plurality of connection members that is coupled to and extends from the bearing mount, where the plurality of connection members is configured to maintain a position of the bearing mount and the unidirectional bearing along the shaft.

BRIEF DESCRIPTION OF THE DRAWINGS

Various aspects of this disclosure may be better understood upon reading the following detailed description and upon reference to the drawings in which:

FIG. 9 is an exploded perspective view of an embodiment of a bearing assembly for a condenser fan, in accordance with an aspect of the present disclosure;

FIG. 10 is a perspective view of an embodiment of a bearing assembly for a condenser fan, in accordance with an aspect of the present disclosure;

DETAILED DESCRIPTION

Figure 1:
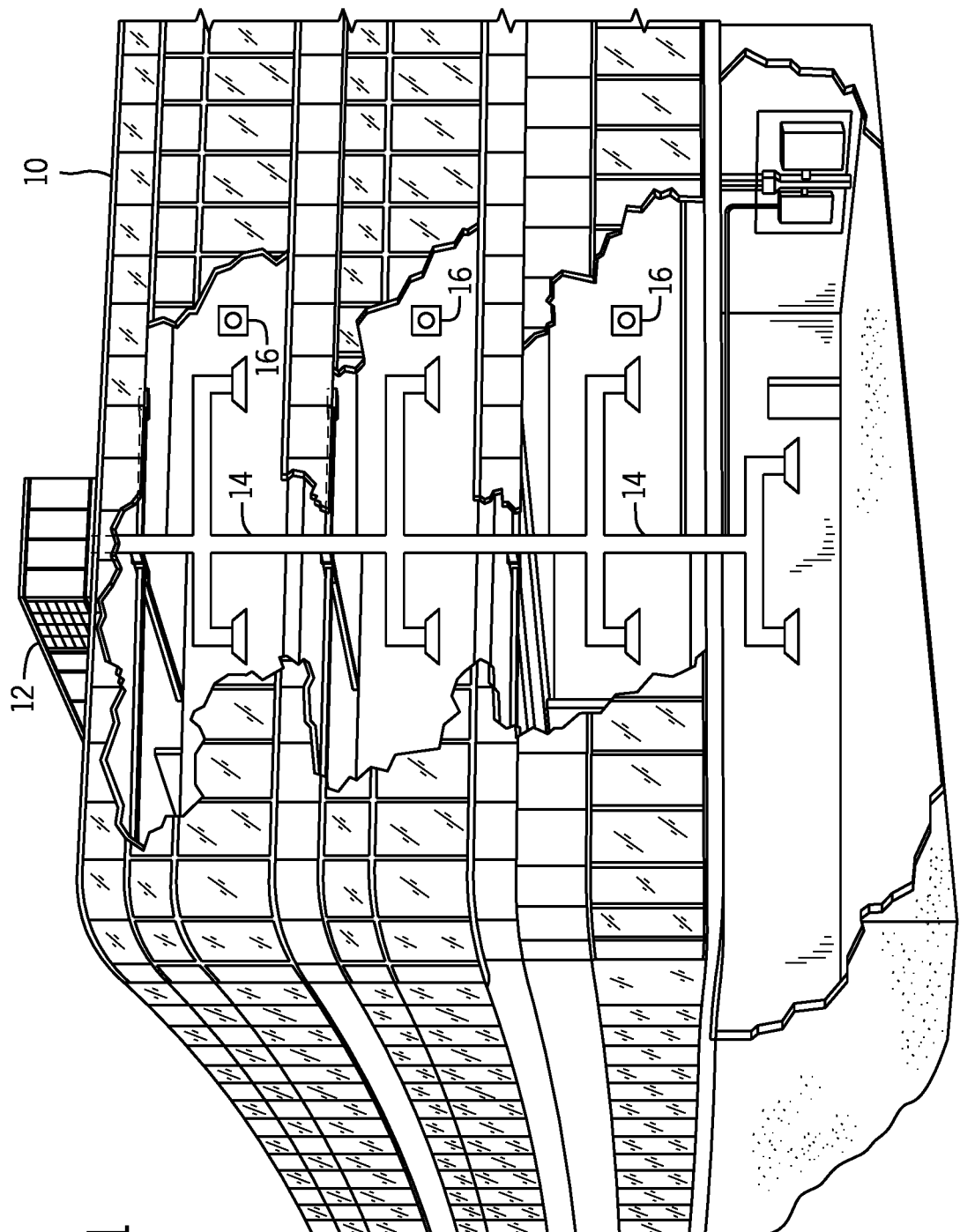
FIG. 1 is a perspective view of an embodiment of a building that may utilize a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As briefly discussed above, a heating, ventilation, and/or air conditioning (HVAC) system may be used to thermally regulate a space within a building, home, or other suitable structure. The HVAC system generally includes a vapor compression system that transfers thermal energy between a heat transfer fluid, such as a refrigerant, and a fluid to be conditioned, such as air. The vapor compression system typically includes a condenser and an evaporator that are fluidly coupled to one another via a conduit to form a refrigerant circuit. A compressor of the refrigerant circuit may be used to circulate the refrigerant through the conduit and enable the transfer of thermal energy between the condenser and the evaporator.

In many cases, a condenser fan assembly may be coupled to the condenser and is configured to draw or force an air flow thereacross. For example, the condenser fan assembly may include a shroud that is coupled to one or more coils of the condenser. The shroud may define one or more flow passages that are in fluid communication with a heat exchange area of the coils. A fan may be positioned within or adjacent to each of the flow passages and is configured to force a flow of ambient air through the flow passages and across the heat exchange area of the condenser coils. Accordingly, the condenser fan assembly may facilitate heat transfer between refrigerant circulating through the condenser coils and an ambient environment, such as the atmosphere.

As noted above, one or more of the condenser fans may be deactivated during certain operational periods of the HVAC system. As an example, certain of the fans may be deactivated when a temperature of refrigerant exiting the condenser falls below a threshold value or deviates from a target range. Deactivating some of the condenser fans may decrease a rate of air flow drawn across the condenser coils, which may result in a reduction in a heat transfer rate between the refrigerant flowing through the condenser coils and the ambient environment. Accordingly, a temperature of refrigerant discharging from the condenser may increase to approach the threshold value and/or remain with the designated target range.

In some cases, operational fans of the condenser fan assembly may draw a backflow of air through flow passages of the shroud that are associated with inactive fans. That is, active fans may draw an air flow through the flow passages associated with the inactive fans in a direction that is opposite a direction of air flow passing through these flow passages during operation of the inactive fans. This backflow of air may impart a force on fan blades of the inactive fans and induce rotation of the inactive fans. Specifically, the backflow of air may cause the inactive fans to rotate in a reverse rotational direction that is opposite an operational rotational direction of the fans. The reverse rotational motion of the inactive fans may increase a flow rate of the backflow of air and, as a result, promote the generation of air vortices extending between flow passages associated with active fans and flow passages associated with inactive fans. Unfortunately, such air vortices may reduce a quantity of air that is drawn across the condenser by the active fans, which may decrease an effectiveness of the condenser fan assembly. As discussed in more detail below, the reverse rotational motion of the inactive fans may additionally increase a torque load on certain components of the condenser fan assembly during restart of these inactive fans. In some cases, this elevated restart torque load may cause components of the condenser fan assembly to incur wear and/or performance degradation over time. Moreover, the free-spinning reverse rotational motion of the inactive fans may hinder the use of certain types of electric motors to drive operation of the fans.

It is now recognized that blocking reverse rotational motion of inactive condenser fans may reduce a flow rate of backflow air flowing through the shroud flow passages corresponding to these inactive fans. Additionally, it is now recognized that maintaining the inactive fans in a substantially stationary position enables the fan blades of the inactive fans to impede air flow through the flow passages. Accordingly, a quantity of air, such as backflow air, recirculating between the flow passages associated with active fans and the flow passages associated with inactive fans may be reduced or substantially mitigated, thereby improving an overall effectiveness of the condenser fan assembly. As discussed in detail herein, it is further recognized that blocking reverse rotational motion of inactive condenser fans may reduce a restart load on certain components of the condenser fan assembly, as well as enable the use of relatively inexpensive single phase permanent split capacitor (PSC) motors to drive operation of such fans.

With the foregoing in mind, embodiments of the present disclosure are directed toward a bearing assembly that is configured to block reverse rotational motion of inactive condenser fans. Specifically, the bearing assembly enables the condenser fans to rotate in a first direction, or an operational rotational direction, while rotational motion of the condenser fans in a second direction, opposite the first direction, is substantially blocked. In other words, the bearing assembly may enable the condenser fans to rotate in a first direction to draw or force air across the condenser when the fans are operational, while blocking rotational motion of the condenser fans in an opposite direction when the fans are idle or temporarily deactivated.

To provide such one-way rotational motion of a condenser fan, the bearing assembly may include a bearing mount that is configured to couple a unidirectional bearing to a motor shaft of a motor used to drive operational rotation of the condenser fan. As discussed in detail below, the unidirectional bearing may be configured to rotate freely in a desired direction, while rotational motion of the unidirectional bearing in an opposite direction is substantially blocked. Accordingly, the unidirectional bearing allows rotational motion of the motor shaft in the first direction or, in other words, in an operational direction of the condenser fan. Conversely, the unidirectional bearing may block rotational motion of the motor shaft, and thus the condenser fan, in the second direction, such as during non-operational periods of the condenser fan. In this manner, embodiments of the bearing assembly disclosed herein mitigate the aforementioned shortcomings of conventional condenser fan assemblies. These and other features will be described below with reference to the drawings.

It is important to note that, while the present disclosure describes the bearing assembly as configured for use with a condenser fan, it should be appreciated that the disclosed embodiments may be implemented with a variety of other fans, ventilators, pumps, and/or compressors. For example, the techniques described herein may be used with evaporator fans, furnace ventilators, heating coil fans, or any other suitable flow generating devices in order to permit rotational motion of a fan, rotor, and/or impeller of these devices in a particular direction, while blocking rotational motion in an opposite direction.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
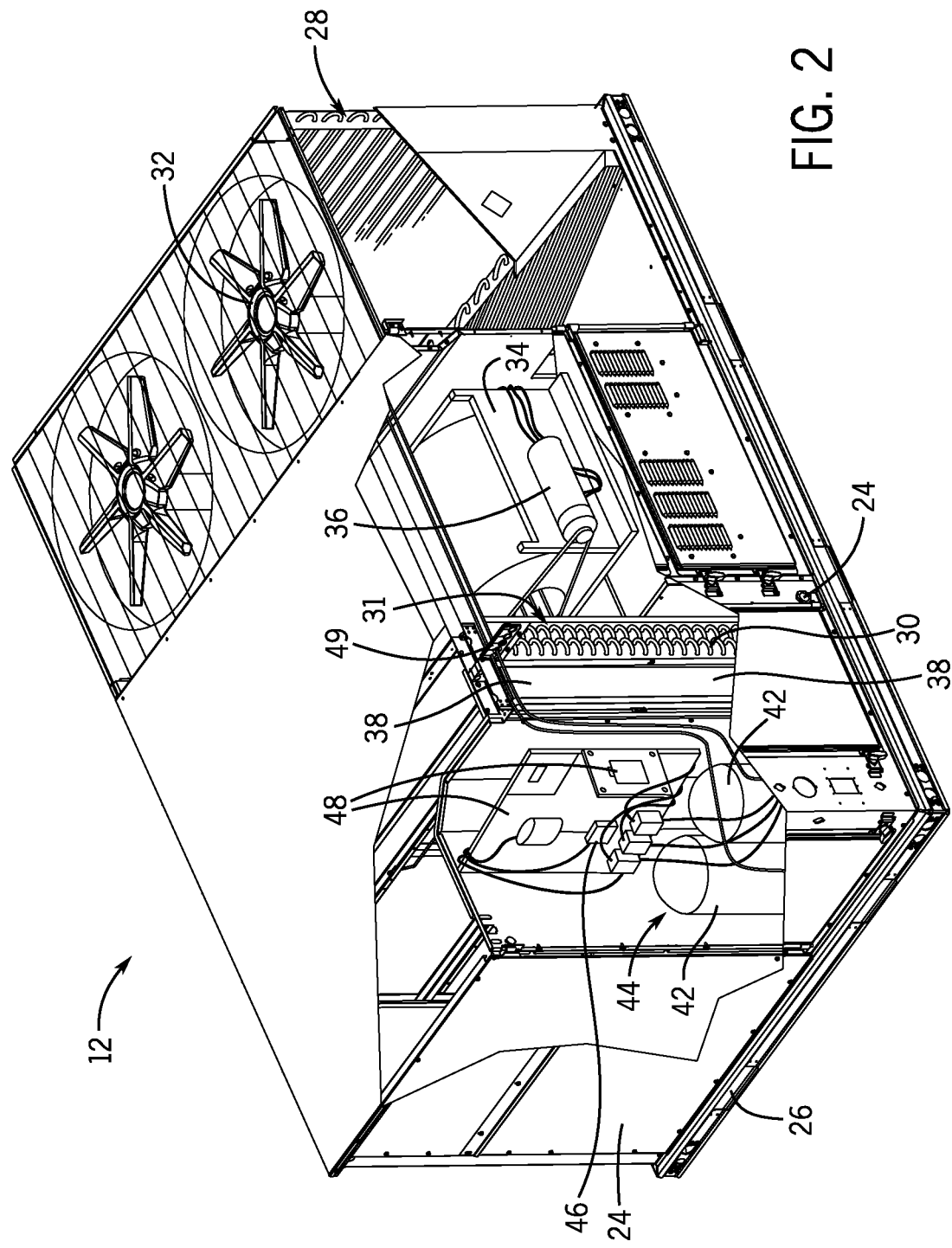
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
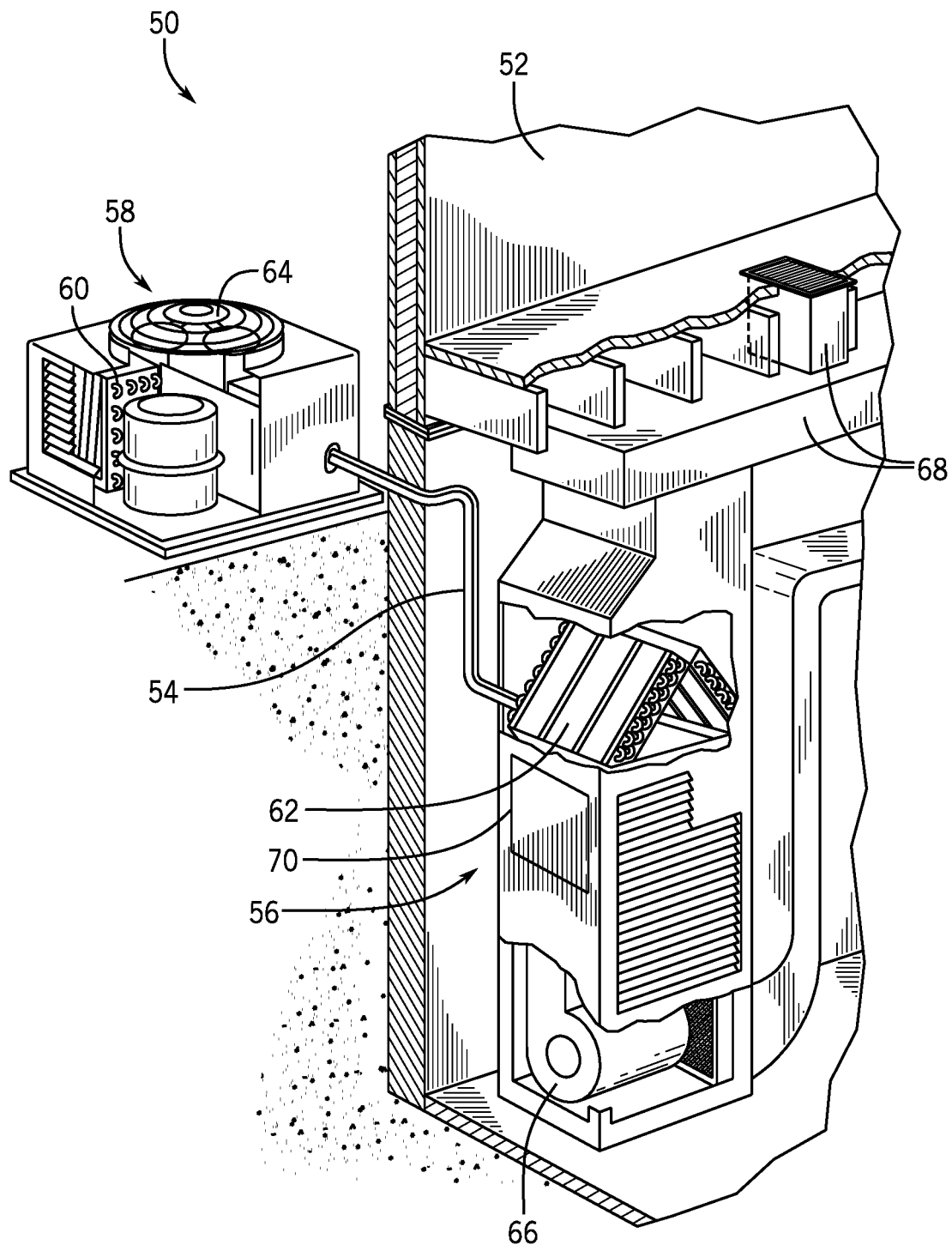
FIG. 3 is a perspective view of an embodiment of a split, residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
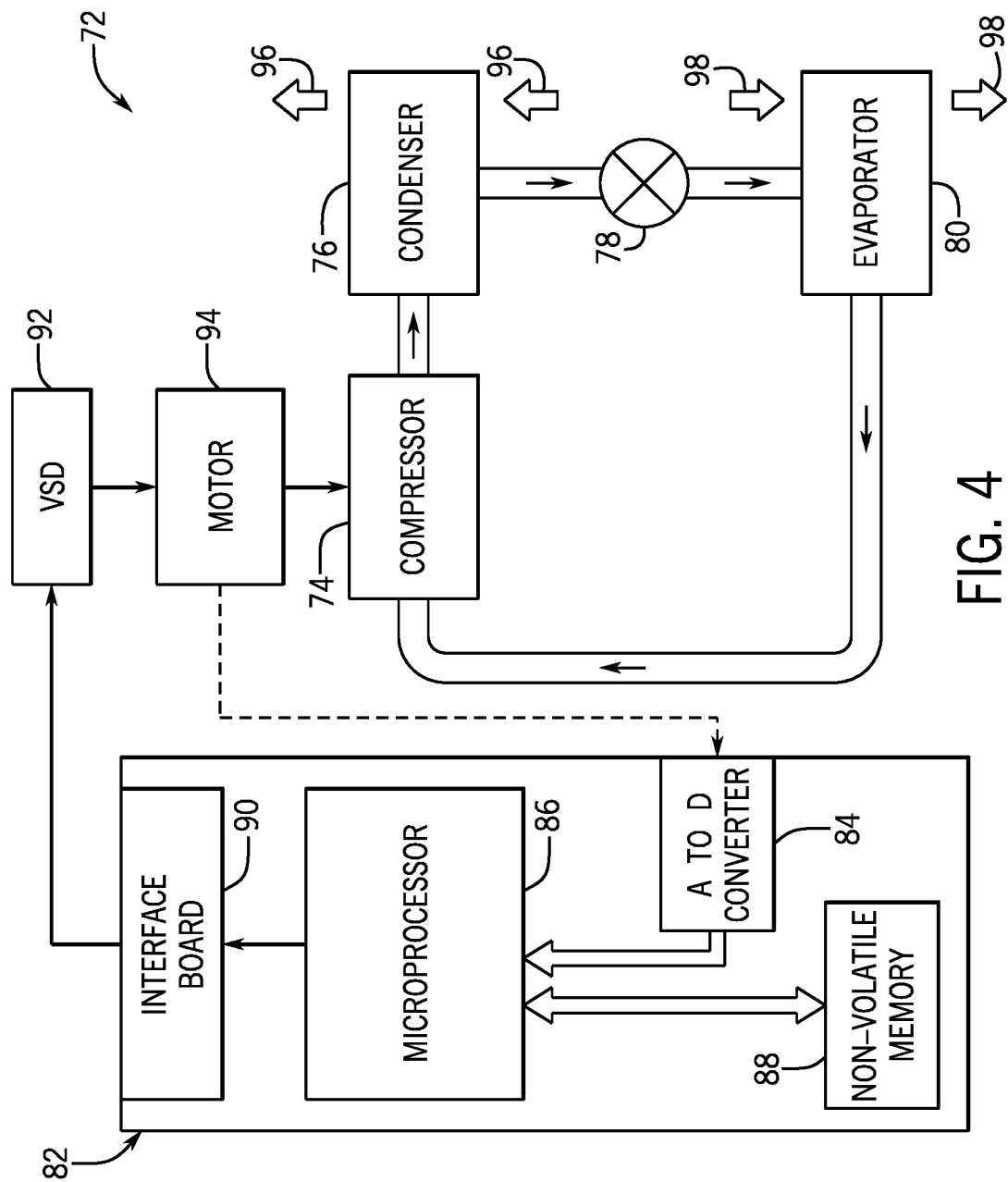
FIG. 4 is a schematic diagram of an embodiment of a vapor compression system that may be used in an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
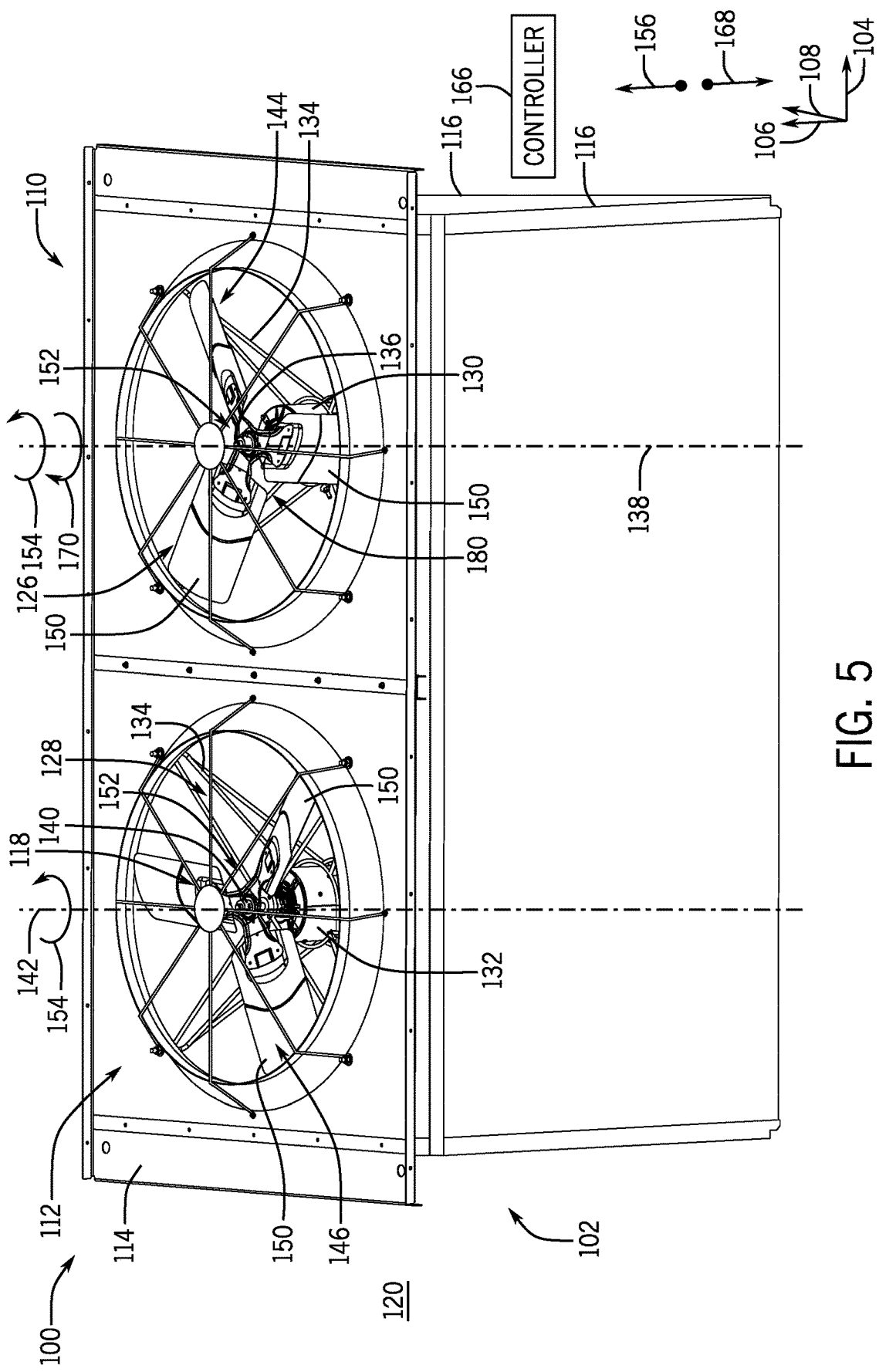
FIG. 5 is a perspective view of an embodiment of a condenser fan assembly, in accordance with an aspect of the present disclosure.

As noted above, HVAC systems often include a fan assembly or a fan array including one or more fans that are configured to direct an air flow across certain components of the HVAC system, such as the heat exchangers 28, 30, the condenser 76, and/or the evaporator 80. For instance, FIG. 5 is a perspective view of an embodiment of a condenser fan assembly 100 that may be used to direct a flow of ambient air across a condenser 102. The condenser fan assembly 100 may be included in embodiments or components of the HVAC unit 12 shown in FIG. 1, embodiments or components of the split residential heating and cooling system 50 shown in FIG. 3, a rooftop unit (RTU), or any other suitable HVAC system. To facilitate discussion, the condenser fan assembly 100 and its components will be described with reference to a longitudinal axis 104, a vertical axis 106, and a lateral axis 108. In the illustrated embodiment, the condenser fan assembly 100 includes a first condenser fan 110 and a second condenser fan 112 that are coupled to a shroud 114. As discussed in detail below, the shroud 114 extends between condenser coils 116 of the condenser 102 to define a space, referred to herein as a chamber 118, between the condenser coils 116 and the shroud 114. In some embodiments, the shroud 114 may include a portion of the HVAC unit 12 and/or include a support structure of the HVAC unit 12.

The first condenser fan 110 and the second condenser fan 112 are positioned within a first passage 126 and a second passage 128, respectively, defined within the shroud 114. The first condenser fan 110 and the second condenser fan 112 include a first motor 130 and a second motor 132, respectively, which are coupled to the shroud 114 via respective motor mounts 134. The motor mounts 134 may be configured to concentrically and/or coaxially align a shaft 136 of the first motor 130 with a first centerline 138 of the first passage 126 and concentrically and/or coaxially align a shaft 140 of the second motor 132 with a second centerline 142 of the second passage 128. The shafts 136, 140 are respectively coupled to a first rotor 144 of the first condenser fan 110 and a second rotor 146 of the second condenser fan 112. Specifically, the first and second rotors 144, 146 each include a plurality of angled fan blades 150 that extend radially from a respective fan blade base 152 coupled to the shafts 136, 140. The motors 130, 132 include internal drive components, such as a rotor and stator assembly, which are operable to impart a torque to the shafts 136, 140 that is sufficient to drive rotation of the shafts 136, 140 and the rotors 144, 146 about the centerlines 138, 142. Particularly, the first motor 130 may rotate the first rotor 144 about the first centerline 138, while the second motor 132 rotates the second rotor 146 about the second centerline 142. Accordingly, the fan blades 150 may engage with air surrounding the first and second rotors 144, 146 to force the air along and through the first and second passages 126, 128.

For example, in some embodiments, the motors 130, 132 may be configured to respectively rotate the first and second rotors 144, 146 in a counter-clockwise direction 154 about the first and second centerlines 138, 142. In certain embodiments, counter-clockwise rotation of the rotors 144, 146 may enable the fan blades 150 to force air along and through the passages 126, 128 a first direction 156 along the vertical axis 106. Accordingly, the first and second condenser fans 110, 112 may generate a region of relatively low pressure within the chamber 118 that may be less than an ambient atmospheric pressure surrounding the chamber 118. As a result, this pressure difference may force higher pressure ambient air across a heat exchange area the condenser coils 116 and into the chamber 118. In this manner, the first and second condenser fans 110, 112 may draw a flow of ambient air across the condenser 102 and, thus, enable the ambient air to absorb thermal energy from a refrigerant circulating therethrough. Upon entering the chamber 118, the condenser fans 110, 112 may discharge the ambient air through the first and second passages 126, 128 as heated exhaust air. Accordingly, the condenser fan assembly 100 may facilitate heat exchange between the refrigerant circulating through the condenser 102 and an ambient environment 120, thereby increasing an overall operational efficiency of the condenser 102. Although two condenser fans 110, 112 are shown in the illustrated embodiment, it should be noted that in other embodiments, the condenser fan assembly 100 may include any suitable quantity of condenser fans 110, 112. As an example, the condenser fan assembly 100 may include 1, 2, 3, 4, 5, 6, or more than 6 condenser fans that are positioned within or adjacent to respective passages of the shroud 114.

For clarity, it should be noted that throughout the following discussion, descriptions referring to the rotational motion of the first and second condenser fans 110, 112 may refer to some components or all components of the first and second condenser fans 110, 112 that are configured to rotate about respective rotational axes of the first and second condenser fans 110, 112. For example, as used herein, "rotation of the first condenser fan 110" may refer to rotational motion of the shaft 136, the first rotor 144, the fan blades 150 of the first rotor 144, and/or internal components of the first motor 130, such as an electromagnetic rotor of the first motor 130. Similarly, as used herein, "rotation of the second condenser fan 112" may refer to rotational motion of the shaft 140, the second rotor 146, the fan blades 150 of the second rotor 146, and/or internal components of the second motor 132. Accordingly, it is important to note that rotational motion of the first and second condenser fans 110, 112 may be discussed below with respect to the individual components of the first and second condenser fans 110, 112 or with respect to the first and second condenser fans 110, 112 as respective assemblies that include some or all of the aforementioned components.

With the foregoing in mind, in some embodiments, a temperature of refrigerant discharging from the condenser 102 may drop below a target value or decrease below a target operating range of values. As an example, such an operating condition may occur when a temperature of the ambient environment 120 surrounding the condenser fan assembly 100 is relatively low. In such cases, directing ambient air across the condenser 102 via both the first and second condenser fans 110, 112 may enable the cool ambient air to absorb a relatively large amount of thermal energy from refrigerant circulating through the condenser 102 and, thus, cause a discharge temperature of the refrigerant to decrease below a desired target temperature or target range. Accordingly, to increase the refrigerant discharge temperature, a controller 166 of the condenser fan assembly 100, the control device 16 of the HVAC unit 12, and/or any other suitable control system of the HVAC unit 12 may generate a command or control signal to temporarily suspend operation the first condenser fan 110 or the second condenser fan 112, thereby reducing a flow rate of ambient air flowing across the condenser 102. In this manner, the controller 166 may reduce a rate of heat transfer between the refrigerant and the ambient environment 120, thereby enabling a temperature of refrigerant discharging from the condenser 102 to increase and approach the desired target discharge temperature.

For example, in some embodiments, the controller 166 may send a command or control signal to deactivate the first condenser fan 110 upon receiving an indication that a discharge temperature of refrigerant exiting the condenser 102 is below the target temperature. Accordingly, the second condenser fan 112 may remain operational to direct ambient air across the condenser 102 and into the chamber 118, while operation of the first condenser fan 110 is suspended. As noted above, operation of the second condenser fan 112 may decrease a pressure within the chamber 118 below a pressure of the ambient environment 120. In certain embodiments, this pressure differential may force ambient air into the chamber 118 via the first passage 126 of the inactive first condenser fan 110. Specifically, air from the ambient environment 120 may flow through the first passage 126 in a second direction 168 that is substantially opposite the first direction 156. Throughout the following discussion, such air flowing through the first passage 126 in the second direction 168 will be referred to herein as "backflow air."

The backflow air may engage with the fan blades 150 of the first condenser fan 110 and impart a force on the first rotor 144 that may be sufficient to rotate the first rotor 144 about the first centerline 138 in a clockwise direction 170. In other words, the backflow air may induce rotation of the first rotor 144 in a direction that is opposite a rotational direction of the first rotor 144 during normal operation of the first condenser fan 110. Generally, such rotation of the first rotor 144 may reduce fluidic restrictions along the first passage 126 and promote the flow of backflow air through the first passage 126 and into the chamber 118. Indeed, rotation of the first rotor 144 in the clockwise direction 170 may force air into the chamber 118. In some embodiments, the counter rotational motion of the non-operational first condenser fan 110 and the operational second condenser fan 112 may generate a vortex of backflow air that may continuously recirculate through the first passage 126 and the second passage 128. That is, backflow air entering the chamber 118 via the first passage 126 may be drawn into the second passage 128 by the second condenser fan 112, discharged through the second passage 128 in the first direction 156, and subsequently recirculated to the first passage 126 by the first condenser fan 110. Unfortunately, this vortex or circulation of backflow air may bypass the heat exchange area of the condenser coils 116 and reduce an amount of ambient air that is drawn across the condenser 102 by the second condenser fan 112. The recirculation of backflow air between the first and second condenser fans 110, 112 may reduce an effectiveness of the second condenser fan 112, and thus, reduce an operational efficiency of the condenser fan assembly 100.

Additionally, the induced clockwise rotational motion of the first rotor 144 may increase a strain on the first motor 130 when the first condenser fan 110 is re-activated to resume normal operation. For example, upon receiving a command from the controller 166 to restart operation, the first motor 130 initially overcomes the rotational inertia of the first rotor 144 to discontinue the clockwise rotational motion of the first rotor 144 before initiating rotation of the first rotor 144 in the counter-clockwise direction 154. In some embodiments, reversing the rotational direction of the first rotor 144 in this manner may impart strain or loading on the shaft 136 of the first motor 130 and/or internal components of the first motor 130 which, in some cases, may cause the first motor 130 to incur wear or performance degradation.

Still further, the induced clockwise rotational motion of the first condenser fan 110 may hinder the use of certain types of electric motors to drive rotation the first condenser fan 110, such as relatively low cost single phase permanent split capacitor (PSC) motors. For example, when activated, single phase PSC motors generally initiate rotation in a particular direction based on a current rotational direction of the motors. That is, a single phase PSC motor having a shaft that is already rotating in a particular rotational direction before receiving a command for activation will typically begin driving rotation of the shaft in that same rotational direction. Accordingly, using a single phase PSC motor as the first motor 130 may cause the first motor 130 to continue rotating the first rotor 144 in the clockwise direction 170 upon receiving a command for reactivation. In other words, upon receiving an indication from the controller 166 to restart operation, the first motor 130 may continue to rotate the first rotor 144 in the clockwise direction 170, and thus, direct a flow of air into, rather than out of, the chamber 118.

Accordingly, embodiments of the present disclosure are directed toward a bearing assembly 180, also referred to herein as a mounting assembly, which is configured to block clockwise rotational motion of the first rotor 144, particularly during inactive operational periods of the first condenser fan 110. That is, the bearing assembly 180 may be configured to enable unidirectional motion of the first condenser fan 110 about a particular rotational direction, while substantially blocking rotational motion of the first condenser fan 110 in an opposite direction. In this manner, the bearing assembly 180 may prevent or substantially reduce occurrence of the aforementioned shortcomings of typical condenser fan assemblies.

Figure 6:
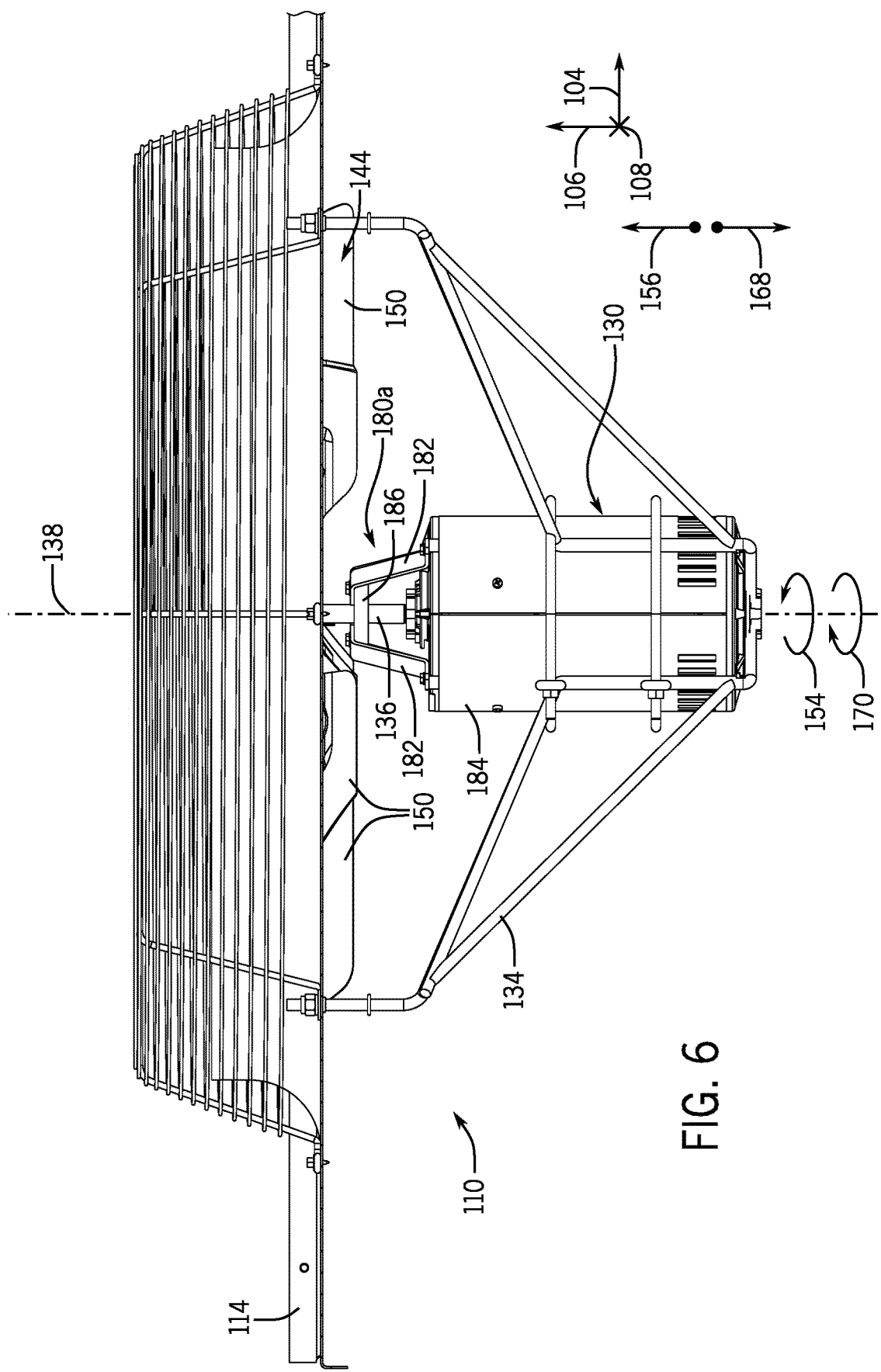
FIG. 6 is a side view of an embodiment of condenser fan having a bearing assembly, in accordance with an aspect of the present disclosure.

With the foregoing in mind, FIG. 6 is a side view of the first condenser fan 110 having an embodiment of the bearing assembly 180. As shown in the illustrated embodiment, a bearing assembly 180a may include a plurality of connection members 182 that are coupled to a housing 184 of the first motor 130. The housing 184 may be coupled to and/or supported by the motor mount 134 and may encompass internal components of the first motor 130, such as a rotor and stator assembly, which are configured to drive rotation of the shaft 136 relative to the housing 184. The connection members 182 may be coupled to a bearing mount 186 that, as discussed in detail below, is configured to support a unidirectional bearing that is disposed about the shaft 136. The connection members 182 may position the bearing mount 186 substantially concentric to the shaft 136 and may block movement of the bearing mount 186 relative to the shaft 136.

Figure 7:
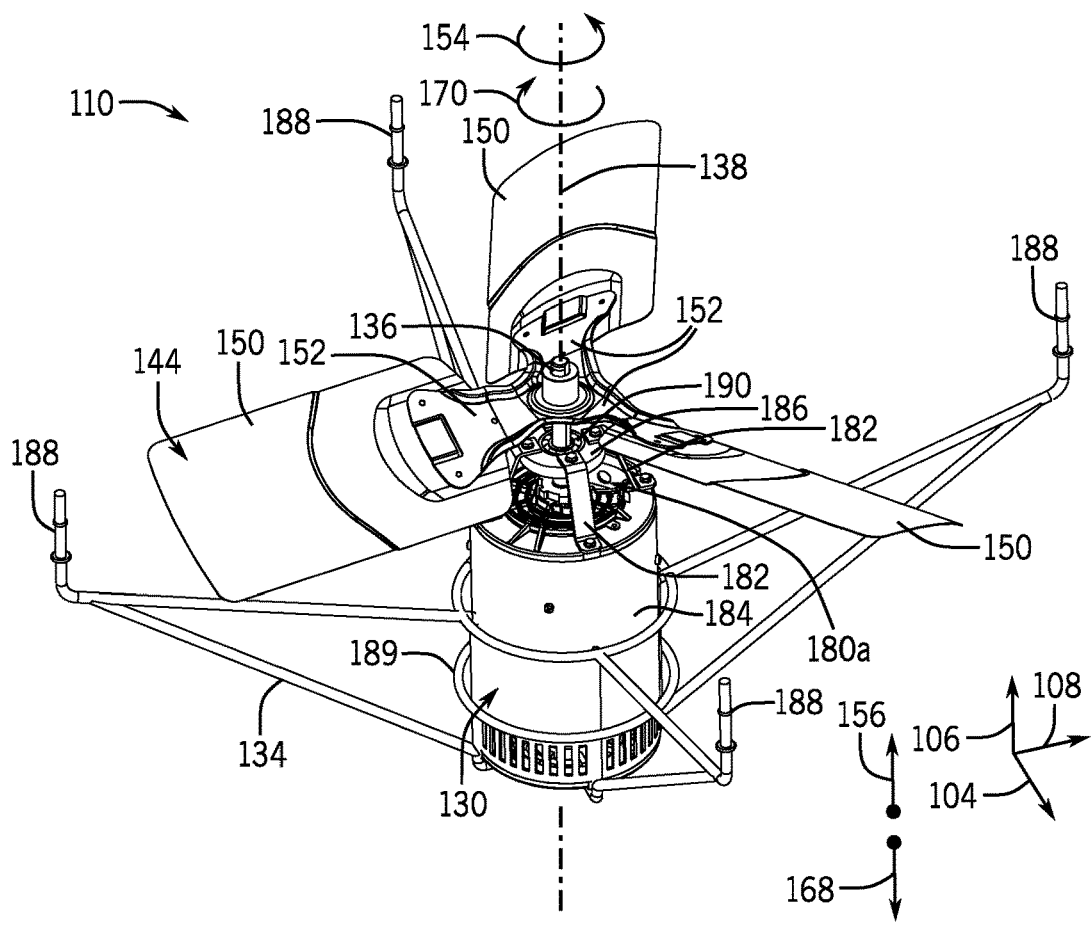
FIG. 7 is a perspective view of an embodiment of a condenser fan having a bearing assembly, in accordance with an aspect of the present disclosure.

FIG. 7 is a perspective view of an embodiment of the first condenser fan 110. As discussed in detail below, the motor mount 134 may be coupled to the shroud 114 via one or more shaft portions 188 that are configured to block movement of the motor mount 134 relative to the shroud 114. As shown, the first motor 130 is disposed and held in place within a cradle portion 189 of the motor mount 134. With the bearing mount 186 coupled to the housing 184, as discussed above, and with the housing 184 secured within the cradle portion 189 of the motor mount 134 that is coupled to the shroud 114, the bearing mount 186 remains substantially stationary relative to the shroud 114.

The bearing mount 186 may be configured to couple to and support a unidirectional bearing 190 that is disposed about the shaft 136. As shown in the illustrated embodiment, the bearing mount 186 may position the unidirectional bearing 190 externally to the first motor 130 between the first rotor 144 and the housing 184. The unidirectional bearing 190 may include a first ring, or an outer ring, which is coupled to the bearing mount 186, and a second ring, or an inner ring, which is coupled to the shaft 136. The unidirectional bearing 190 is configured to enable or permit rotational motion of the outer and inner rings relative to one another in a particular direction, while substantially blocking rotational motion between in the outer and inner rings an opposite rotational direction. Accordingly, the unidirectional bearing 190 may be used to enable or disable rotational motion of the shaft 136 in a particular direction.

Figure 8:
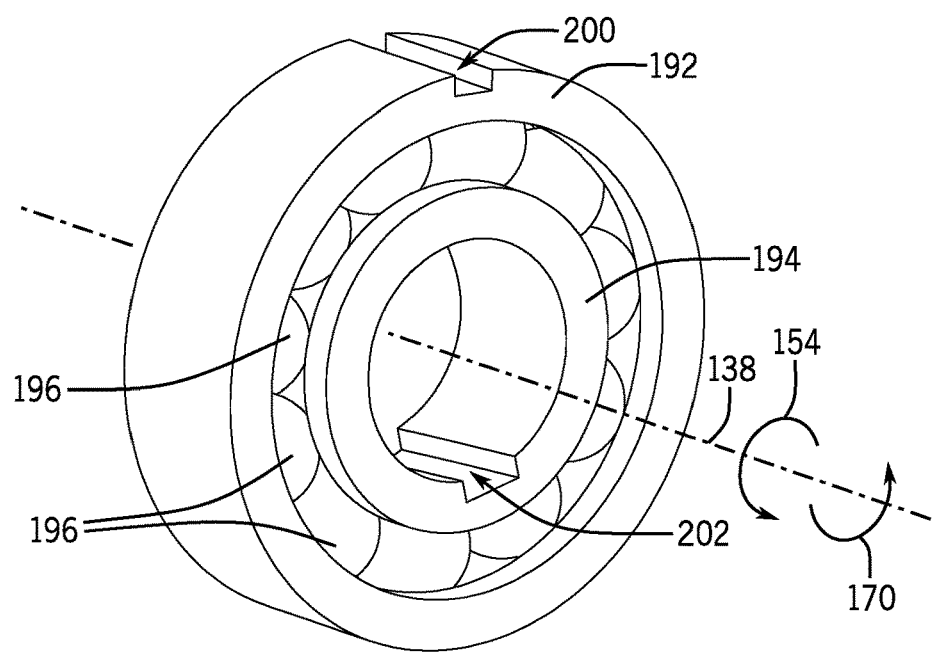
FIG. 8 is a perspective view of an embodiment of a unidirectional bearing that may be used in a bearing assembly of a condenser fan, in accordance with an aspect of the present disclosure.

To better illustrate, FIG. 8 is a perspective view of an embodiment of the unidirectional bearing 190. As shown in the illustrated embodiment, the unidirectional bearing 190 includes an outer ring 192 that is disposed concentrically about an inner ring 194. In some embodiments, the unidirectional bearing 190 may include a plurality of asymmetrical rollers or sprags 196 that are disposed between the outer ring 192 and the inner ring 194. The sprags 196 are configured to transition between a retracted position and an interfering position to enable or disable rotational motion of the inner ring 194 relative to the outer ring 192.

For example, in some embodiments, rotational motion of the inner ring 194 relative to the outer ring 192 in the counter-clockwise direction 154 may cause the asymmetrical sprags 196 to transition to the retracted position. In the retracted position, the sprags 196 are configured to rotate and/or slide freely relative to the outer and inner rings 192, 194, thereby enabling rotational motion of the inner ring 194 relative to the outer ring 192 in the counter-clockwise direction 154. Conversely, when attempting to rotate the inner ring 194 relative to the outer ring 192 in the clockwise direction 170, the sprags 196 may transition to the interfering positing in which the sprags 196 wedge between the outer ring 192 and the inner ring 194. The wedged orientation of the sprags 196 may generate frictional forces between the outer and inner rings 192, 194 that are sufficient to block rotational motion of the inner ring 194 relative to the outer ring 192 in the clockwise direction 170. Accordingly, the unidirectional bearing 190 may enable an object coupled to the inner ring 194, such as the shaft 136, to rotate relative to the outer ring 192 in a first direction, or the counter-clockwise direction 154, while rotational motion of the object relative to the outer ring 192 in a second direction, or the clockwise direction 170, is substantially blocked.

It should be appreciated that the exemplary embodiment of the unidirectional bearing 190 discussed herein is intended to facilitate discussion and may alternatively include any other suitable type of unidirectional bearing or one-way bearing that is configured to enable rotational motion of the inner ring 194 relative to the outer ring 192 in a first direction, while substantially blocking rotational motion of the inner ring 194 relative to the outer ring 192 in a second direction, opposite the first direction. For example, in some embodiments, the unidirectional bearing 190 may include a one-way bearing, a trapped roller clutch bearing, an anti-reverse bearing, ratchet-clutch bearing, and/or any other suitable clutch bearing.

In any case, the unidirectional bearing 190 may include an outer keyway 200 or slot that is defined within an outer diameter of the outer ring 192 and an inner keyway 202 or slot that is defined within an inner diameter of the inner ring 194. As discussed below, the outer keyway 200 is configured to engage with a feature of the bearing mount 186 in an assembled configuration of the bearing assembly 180a to block rotational motion of the outer ring 192 relative to the bearing mount 186. Similarly, in the assembled configuration of the bearing assembly 180a, the inner keyway 202 may be configured to engage with a feature of the shaft 136 to block rotational motion of the inner ring 194 relative to the shaft 136. In this way, the outer ring 192 may be rotationally fixed relative to the bearing mount 186, and the inner ring 194 may be rotationally fixed relative to the shaft 136. Although the outer and inner keyways 200, 202 are shown as having a generally quadrilateral cross-section in the illustrated embodiment of FIG. 8, it should be noted that the outer keyway 200, the inner keyway 202, or both, may include any other suitable cross-sectional shape in other embodiments of the unidirectional bearing 190.

FIG. 9 is an exploded perspective view of an embodiment of the bearing assembly 180a. As shown in the illustrated embodiment, the bearing mount 186 may include a plurality of mounting apertures 210 that enable fasteners 212, such as bolts, rivets, friction pins, or the like, to secure the connection members 182 to the bearing mount 186. Additionally or alternatively, suitable adhesives, such as bonding glue, may be used to couple to connection members 182 to the bearing mount 186. Although the bearing assembly 180a includes four connection members 182 in the illustrated embodiment, it should be noted that, in other embodiments, the bearing assembly 180a may include any other suitable quantity of connection members 182 to support the bearing mount 186 and secure the bearing mount 186 in place. That is, the bearing assembly 180a may include 1, 2, 3, 4, 5, 6, or more than 6 connection members 182. In further embodiments, the connection members 182 may be formed integrally with the bearing mount 186. As a non-limiting example, the bearing mount 186 and the connection members 182 may be formed as a single piece component via an injection molding process or an additive manufacturing process.

As shown in the illustrated embodiment, the bearing mount 186 includes an opening 216 that is configured to receive the unidirectional bearing 190. The outer keyway 200 may be configured to engage with a protrusion 218 or key, as shown in FIG. 10, of the bearing mount 186, which extends radially inward from an interior surface 219 of the bearing mount 186 relative to the first centerline 138. In some embodiments, the protrusion 218 may include a cross-sectional shape that is geometrically similar to a cross-sectional shape of the outer keyway 200. In this manner, the protrusion 218 may engage with outer keyway 200 upon insertion of the unidirectional bearing 190 into the opening 216, such that rotational motion of the outer ring 192 relative to the bearing mount 186 is blocked.

In some embodiments, an interference fit may be used to retain the unidirectional bearing 190 within the opening 216 and to block movement of the unidirectional bearing 190 relative to the bearing mount 186. For example, to achieve the interference fit, an outer diameter of the outer ring 192 may be marginally greater than an inner diameter of the opening 216. Accordingly, upon insertion of the unidirectional bearing 190 into the opening 216, the bearing mount 186 may apply a compressive force on the outer ring 192 that is sufficient to block translational movement of the unidirectional bearing 190 relative to the bearing mount 186. In certain embodiments, the compressive force generated by the interference fit may also block rotational motion of the outer ring 192 relative to the bearing mount 186 in addition to, or in lieu of, the engagement between the outer keyway 200 and the protrusion 218.

Similar to the engagement between the outer keyway 200 and the protrusion 218, the inner keyway 202 may be configured to engage with a protrusion or key 220 of the shaft 136, thereby coupling the inner ring 194 to the shaft 136 and blocking rotational motion of the inner ring 194 relative to the shaft 136. Additionally or alternatively, the inner ring 194 may be coupled to the shaft 136 using an interference fit that is generated in accordance with the technique discussed above. In some embodiments, the inner ring 194 and the first rotor 144 may each couple to the shaft 136 via the same key 220. However, in other embodiments, a pair of individual or separate keys may be used to respectively couple the inner ring 194 and the first rotor 144 to the shaft 136.

FIG. 10 is a perspective view of an embodiment of the bearing assembly 180a in an assembled configuration. In some embodiments, the fasteners 212 may couple mounting flanges 226 of the connection members 182 to a first surface 224, such as a top surface, of the bearing mount 186. In certain embodiments, one or more of the mounting flanges 226 may extends radially inward toward the first centerline 138 and may radially overlap with a portion of the unidirectional bearing 190. In this manner, the mounting flanges 226 may be used to block translational movement of the unidirectional bearing 190 along the vertical axis 106, such as in the first direction 156. That is, the mounting flanges 226 may preclude the unidirectional bearing 190 from translating past the first surface 224 of the bearing mount 186 to ensure that the unidirectional bearing 190 remains disposed within the opening 216. Additionally or alternatively, one or more of the mounting flanges 226 may couple to a lower surface of the bearing mount 186 that is opposite the first surface 224 to block movement of the unidirectional bearing 190 along the vertical axis 106 in the second direction 168 and past the lower surface.

Figure 11:
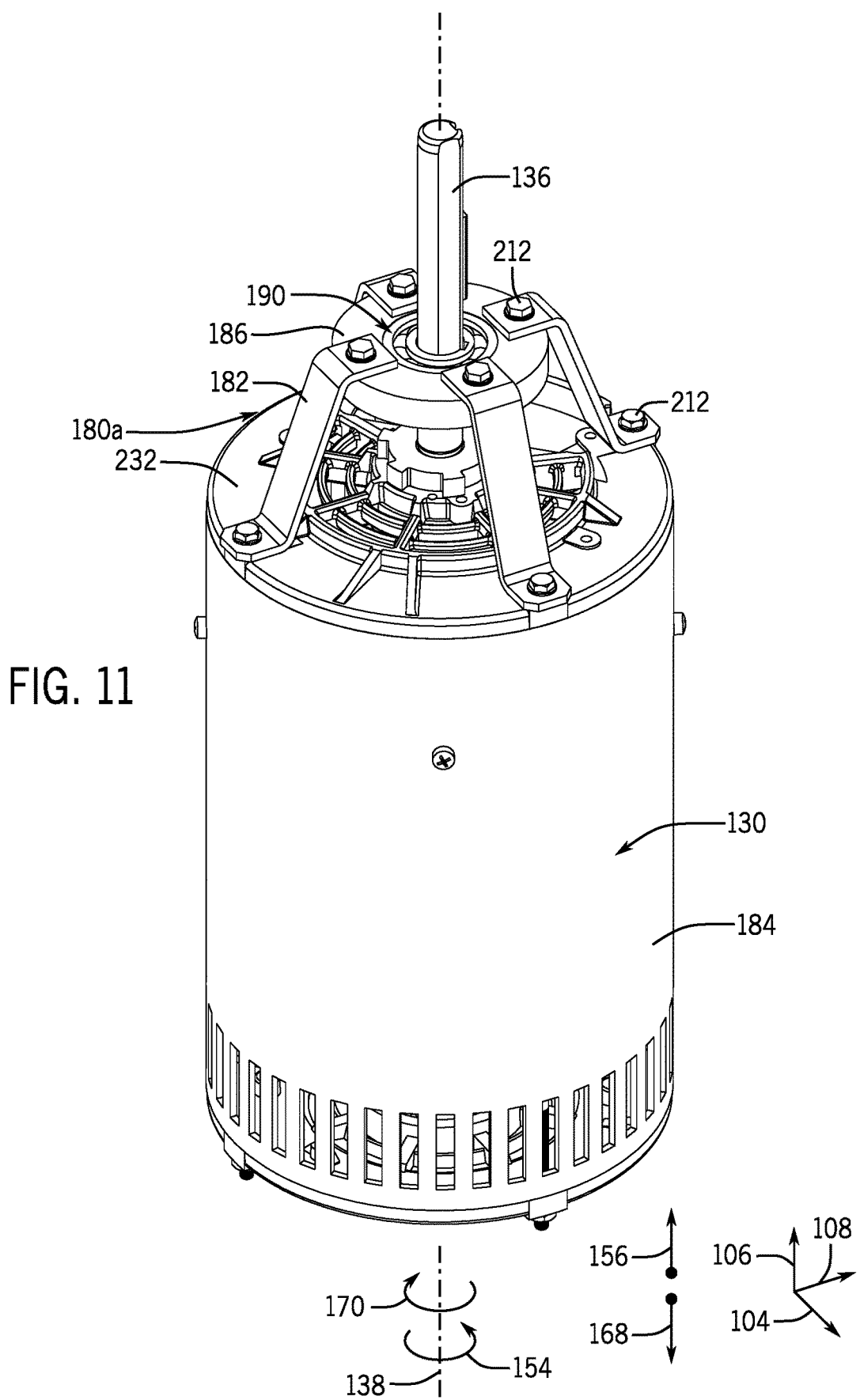
FIG. 11 is a perspective view of an embodiment of a condenser fan motor having a bearing assembly, in accordance with an aspect of the present disclosure.

FIG. 11 is a perspective view of an embodiment of the bearing assembly 180a and the first motor 130. As shown in the illustrated embodiment, the fasteners 212 may be used to couple the connection members 182 to an end face 232 of the housing 184. However, in other embodiments, the connection members 182 may couple to any other suitable portion of the first motor 130. In some embodiments, the bearing assembly 180a may be designed a retro-fit kit that is configured to engage with pre-existing mounting apertures formed within the housing 184. For example, the connection members 182 may be configured to align with pre-existing mounting apertures formed within the end face 232 and/or other portions of the housing 184, thereby enabling the fasteners 212 to engage with the apertures when coupling the bearing assembly 180a to the first motor 130. In this manner, the bearing assembly 180a may be retro-fitted to the first motor 130 without alteration of the housing 184, which may reduce assembly time and/or manufacturing costs of the first condenser fan 110. As such, retro-fitting the bearing assembly 180a to an existing motor may enable the bearing assembly 180a to restrict rotational motion of a shaft of the motor to a particular direction. As an example, the bearing assembly 180a may be retro-fitted with a single phase PSC motor that may be used as the first motor 130.

Figure 12:
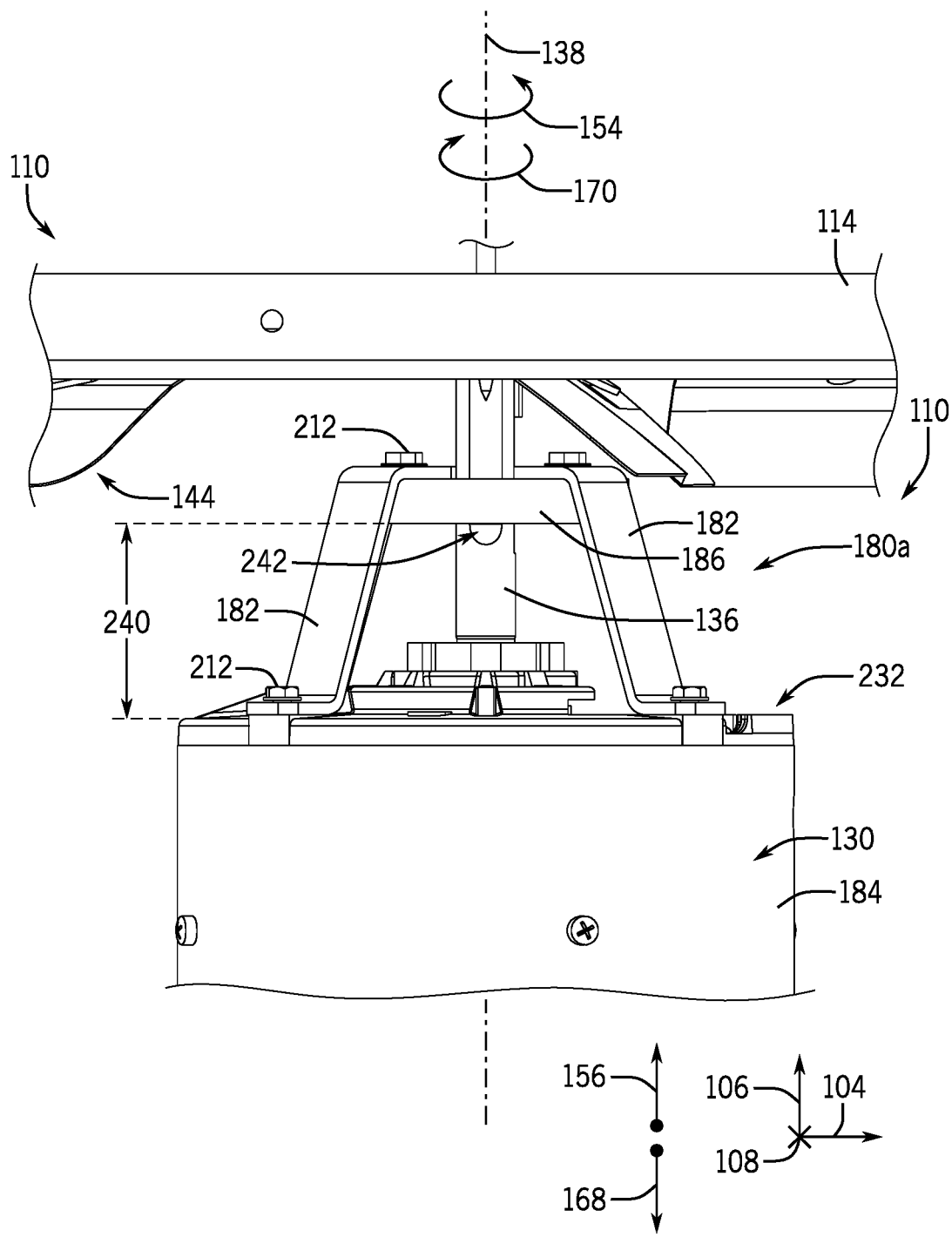
FIG. 12 is an expanded side view of an embodiment of the condenser fan of FIG. 6, in accordance with an aspect of the present disclosure.

FIG. 12 is an expanded side view of an embodiment of the first condenser fan 110. As noted above, in some embodiments, the bearing mount 186 may be configured to position the unidirectional bearing 190 at a particular location along the shaft 136. For example, the connection members 182 may be sized to position the unidirectional bearing 190 at a predetermined distance 240 from the end face 232 of the housing 184. In some embodiments, positioning the unidirectional bearing 190 at the distance 240 from the end face 232 may enable the unidirectional bearing 190 to engage with a feature 242 of the shaft 136, such as a protrusion, notch, taper, and/or groove of the shaft 136, which is configured to block translational movement of the unidirectional bearing 190 along the shaft 136 in the second direction 168. That is, the feature 242 may be configured to support the unidirectional bearing 190 and thereby ensure that the unidirectional bearing 190 remains positioned along a particular portion of the shaft 136.

Figure 13:
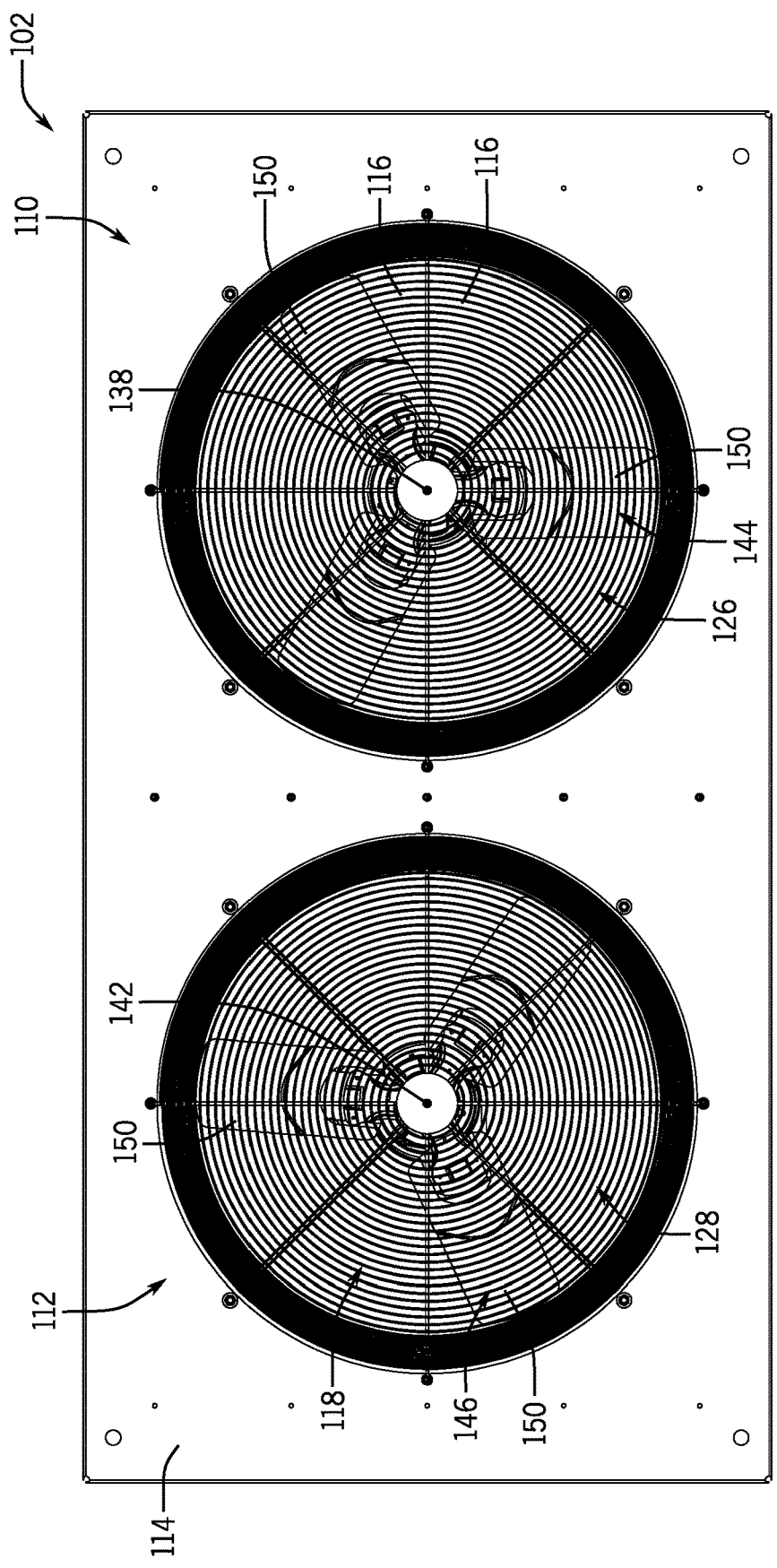
FIG. 13 is a top view of an embodiment of the condenser fan assembly of FIG. 5, in accordance with an aspect of the present disclosure.

FIG. 13 is a top view of an embodiment of the condenser fan assembly 100. In the illustrated embodiment, the first condenser fan 110 is inactive, while the second condenser fan 112 is operational to direct an air flow through second passage 128 in the first direction 156. As noted above, the bearing assembly 180a may block rotational motion of the first condenser fan 110 in the clockwise direction 170 during non-operational periods of the first condenser fan 110. As a result, the stationary fan blades 150 of the first rotor 144 may obstruct a portion of the first passage 126 to reduce a quantity of backflow air that may enter the chamber 118 via the first passage 126. For example, the stationary fan blades 150 of the first condenser fan 110 may occlude approximately 30 percent of the cross-sectional area of the first passage 126 which, in some cases, may reduce a flow rate of backflow air through the first passage 126 between about 20 percent and about 30 percent, as compared to a flow rate of backflow air through the first passage 126 in embodiments of the condenser fan assembly 100 that do not include the bearing assembly 180a coupled to the first condenser fan 110. Accordingly, the bearing assembly 180a may improve an effectiveness of the second condenser fan 122 by reducing an amount of backflow air that is recirculated between the operational second condenser fan 112 and the non-operational first condenser fan 110.

Figure 14:
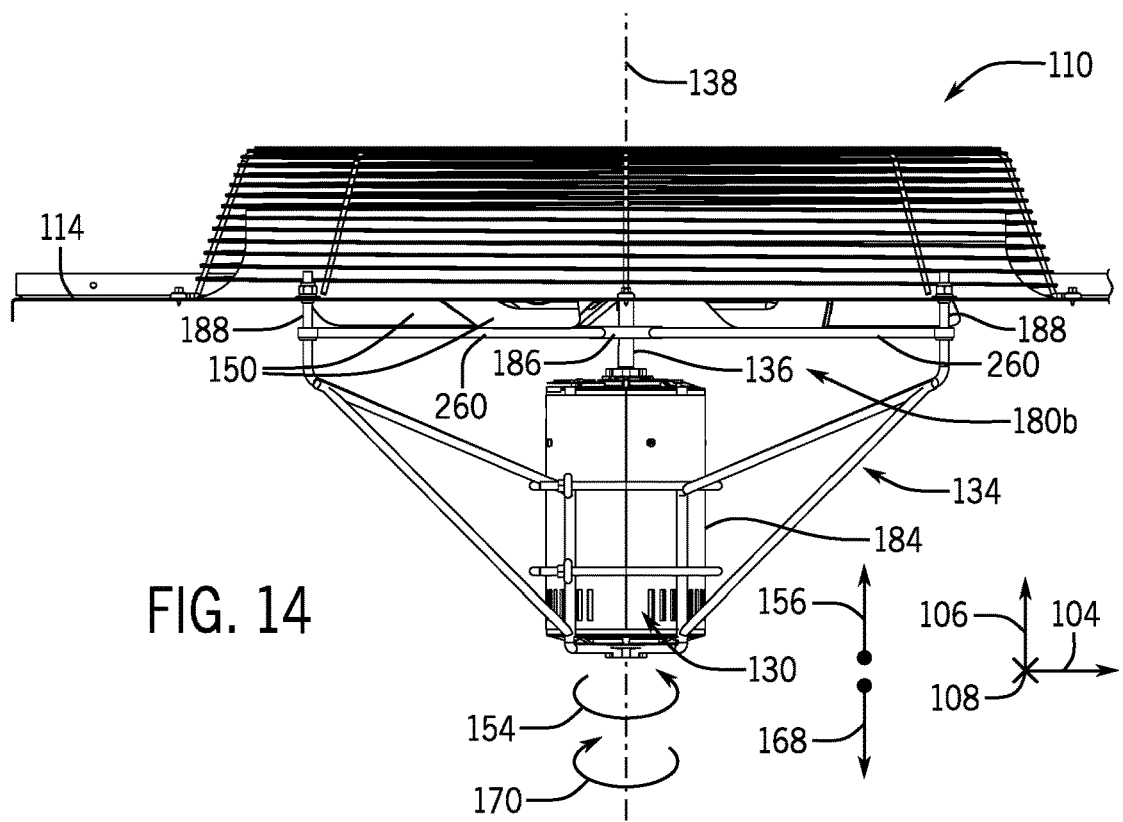
FIG. 14 is a side view of an embodiment of condenser fan having a bearing assembly, in accordance with an aspect of the present disclosure.
Figure 15:
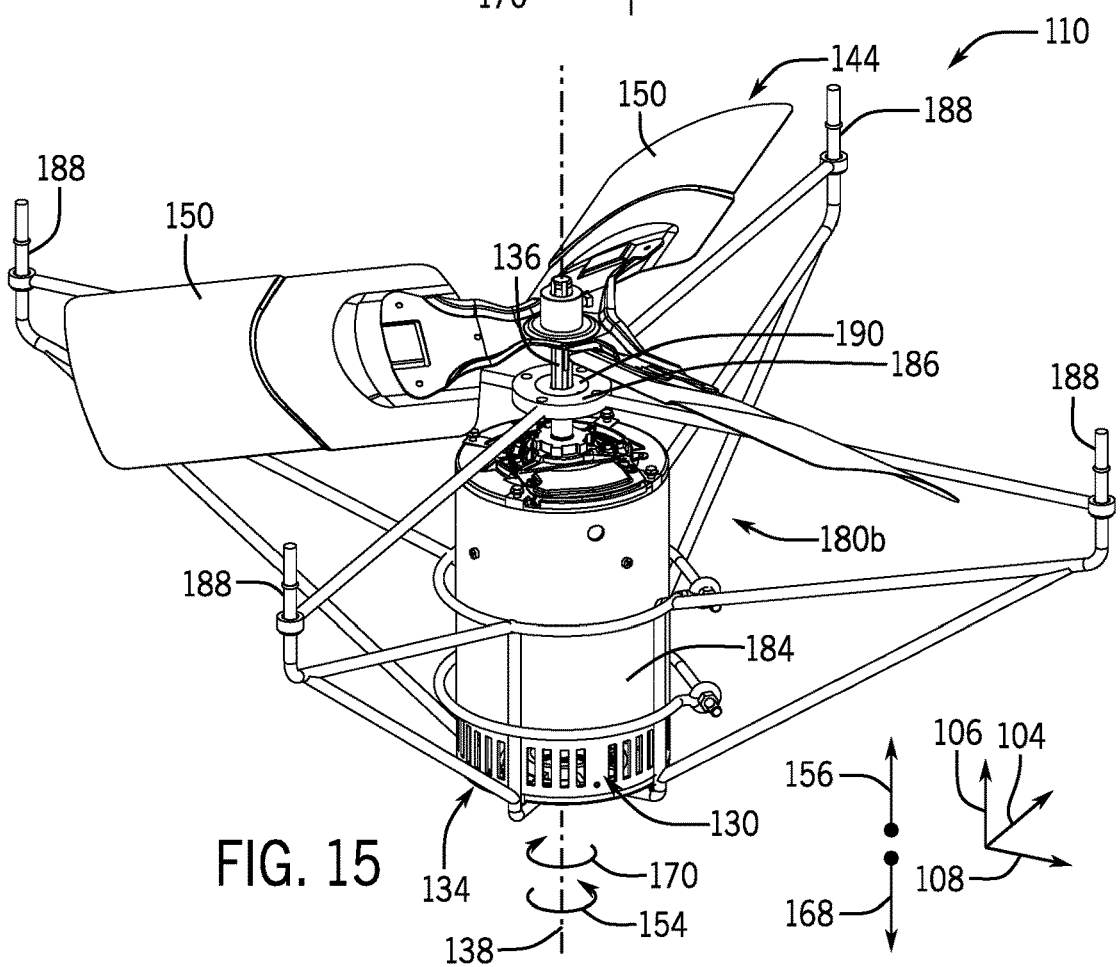
FIG. 15 is a perspective view of an embodiment of a condenser fan having a bearing assembly, in accordance with an aspect of the present disclosure.

FIG. 14 is a side view of the first condenser fan 110 having another embodiment of the bearing assembly 180. In particular, the illustrated embodiment shows a bearing assembly 180b including a plurality of rods 260, also referred to herein as the connection members 182, which are configured to couple the bearing mount 186 to the motor mount 134 instead of the housing 184. For example, as noted above, the motor mount 134 may include the shaft portions 188 that are configured to couple the motor mount 134 to the shroud 114. Particularly, the shaft portions 188 may extend through respective mounting apertures formed within the shroud 114 and may enable fasteners 268 to couple the motor mount 134 to the shroud 114. The rods 260 may couple to and/or engage with the shaft portions 188 to position the bearing mount 186 and the unidirectional bearing 190 along the shaft 136 in a desired location. For clarity, FIG. 15 is a perspective view of an embodiment of the first condenser fan 110 having the bearing assembly 180b. As shown in the illustrated embodiment, the rods 260 may extend between the bearing mount 186 and respective ones of the shaft portions 188.

Figure 16:
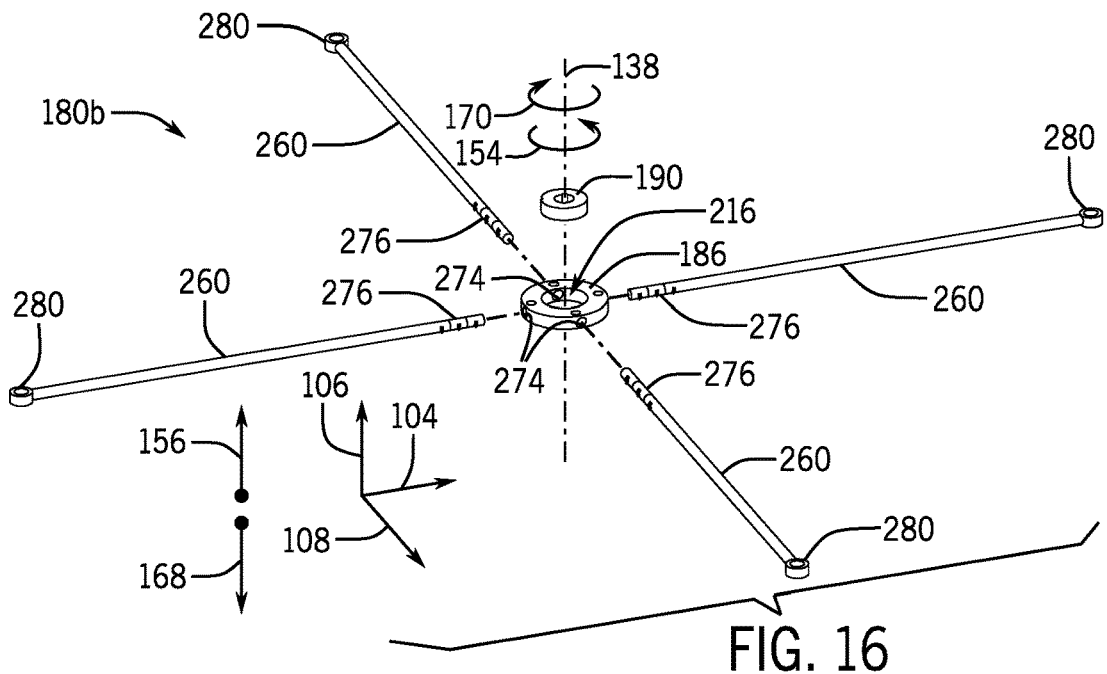
FIG. 16 is an exploded perspective view of an embodiment of a bearing assembly for a condenser fan, in accordance with an aspect of the present disclosure.

FIG. 16 is an exploded perspective view of an embodiment of the bearing assembly 180b. As shown in the illustrated embodiment, the bearing mount 186 may include a plurality of radial passages 274 or receptacles that are configured to receive respective rods 260. The passages 274 may extend radially from a centroid of the opening 216, through the bearing mount 186, and may be spaced symmetrically about a circumference of the bearing mount 186. In some embodiments, the passages 274 may include internal threads that are configured to engage with external threads extending along tip portions 276 of the rods 260. Accordingly, the rods 260 may be coupled to the bearing mount 186 by threadably engaging the rods 260 with the passages 274. In certain embodiments, a suitable adhesive, such as bonding glue, or metallurgical process, such as welding or brazing, may be used couple the rods 260 to the bearing mount 186. Additionally or alternatively, the rods 260 may be coupled to the bearing mount 186 using any other suitable technique. In certain embodiments, the rods 260 and the bearing mount 186 may be integrally formed as a single piece component via an injecting molding process or an additive manufacturing process.

In some embodiments, the passages 274 may extend fully through the bearing mount 186 and into the opening 216. In such embodiments, the rods 260 may be configured to contact the outer ring 192 of the unidirectional bearing 190 positioned within the opening 216 and, in some cases, apply a compressive force to the outer ring 192. For example, engagement between respective threads of the passages 274 and the rods 260 may enable the rods 260 to thread into the passages 274 until the tip portions 276 contact the outer ring 192, thereby enabling the rods 260 to apply and maintain a compressive force on the outer ring 192. In some embodiments, this compressive force may block rotational movement of the outer ring 192 relative to the bearing mount 186 and/or block translational movement of the unidirectional bearing 190 relative to the bearing mount 186 and along the vertical axis 106 in the first and second directions 156, 168. Additionally or alternatively, the unidirectional bearing 190 may be coupled to the bearing mount 186 using any one or combination of the techniques discussed above. Although four rods 260 are shown in the illustrated embodiment of the bearing assembly 180b, it should be noted that, in other embodiments, the bearing assembly 180b may include 1, 2, 3, 4, 5, 6, or more than 6 rods 260 extending from the bearing mount 186. Moreover, although the rods 260 are shown as extending from a center of the bearing mount 186 in a generally radial direction, it should be noted that in other embodiments, the rods 260 may extend from the bearing mount 186 in any other suitable direction.

Figure 17:
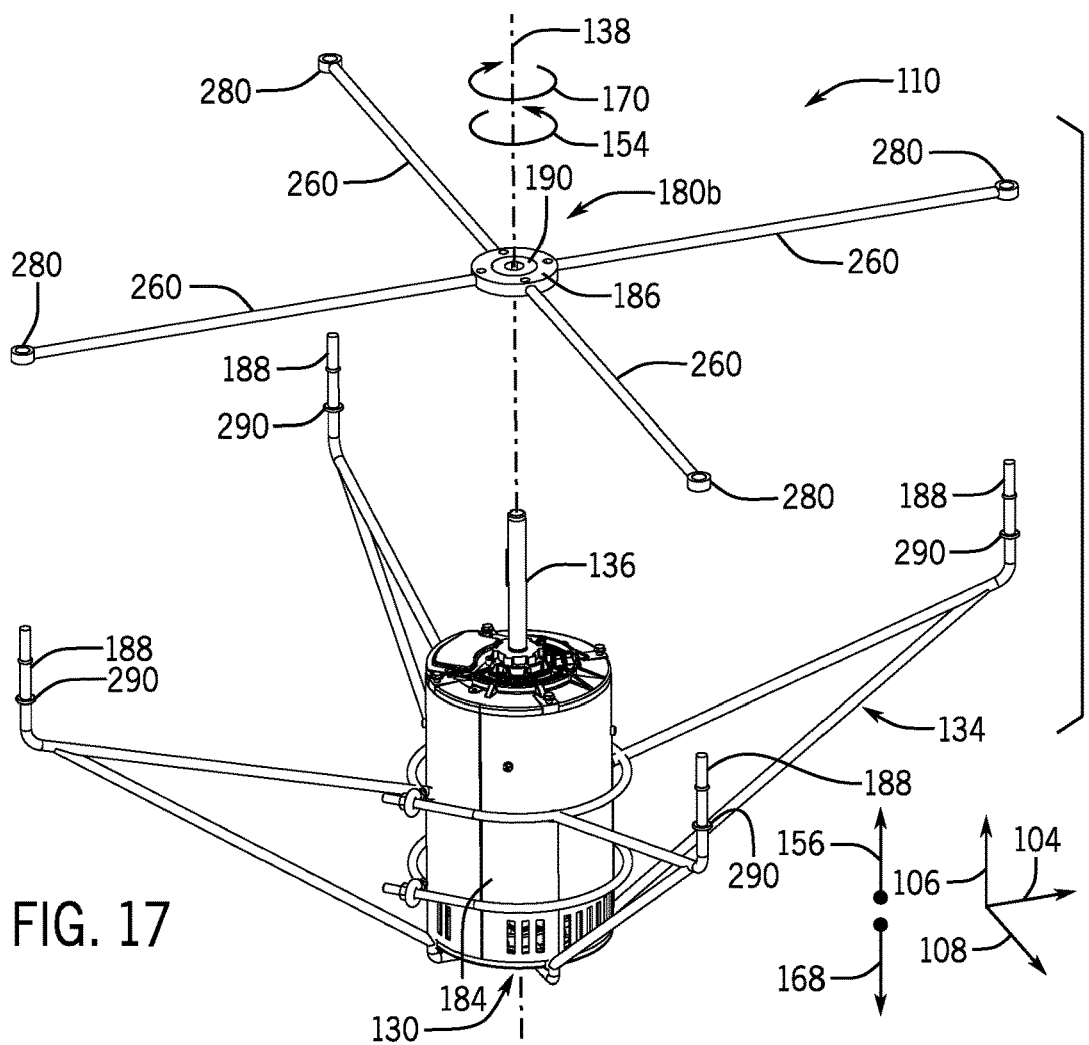
FIG. 17 is an exploded perspective view of an embodiment of a bearing assembly for a condenser fan, in accordance with an aspect of the present disclosure.

In any case, each of the rods 260 may include mounting rings 280 that are configured to engage with the shaft portions 188 of the motor mount 134 to facilitate coupling the bearing assembly 180b to the motor mount 134. For example, FIG. 17 is an exploded perspective view of an embodiment of the first condenser fan 110, which illustrates the engagement between the bearing assembly 180b and the motor mount 134. As shown in the illustrated embodiment, the shaft portions 188 may be configured to extend through the mounting rings 280 and thereby facilitate positioning the unidirectional bearing 190 concentrically with the shaft 136. In some embodiments, the mounting rings 280 may be configured to engage with and/or rest upon mounting flanges 290 protruding from the shaft portions 188. Accordingly, the mounting flanges 290 may facilitate aligning the bearing mount 186 along a particular portion or location of the shaft 136. In some embodiments, the shaft portions 188 may include threads that enable a suitable fastener to engage with the shaft portions 188 and compress the mounting rings 280 against the mounting flanges 290. In this manner, the fasteners may block translational movement of the bearing assembly 180b along the shaft portions 188. Additionally or alternatively, suitable adhesives may be used to couple the mounting rings 280 to the mounting flanges 290 and/or the shaft portions 188. In some embodiments, the bearing assembly 180b may be designed as a retro-fit kit that is configured to couple to motor mounts 134 of existing condenser fan assemblies. Accordingly, the bearing assembly 180b may be used to block backflow air induced rotational motion of condenser fans includes in such condenser fan assemblies.

Figure 18:
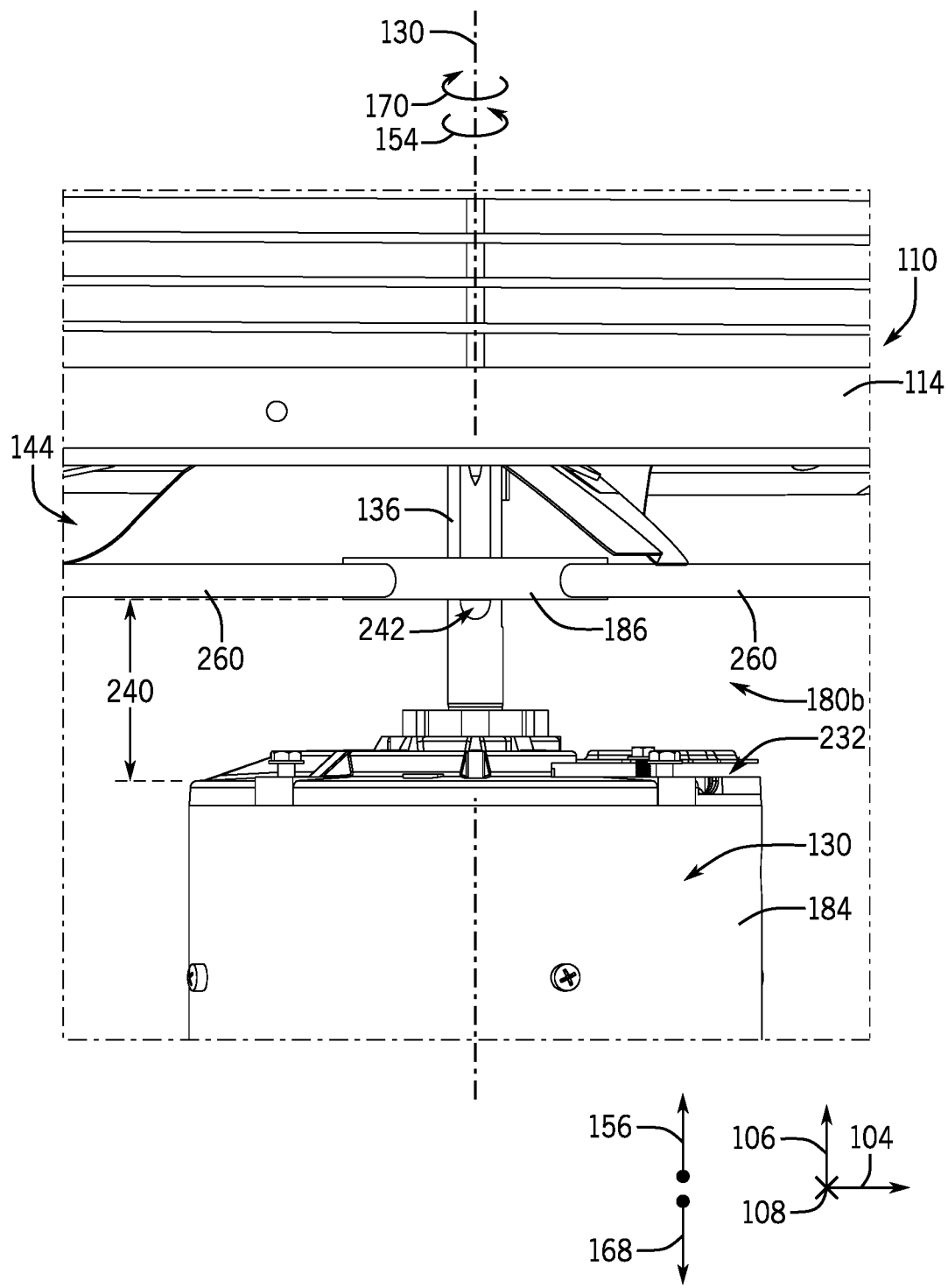
FIG. 18 is an expanded side view of an embodiment of the condenser fan of FIG. 14, in accordance with an aspect of the present disclosure.

Similar to the bearing assembly 180a discussed above, the bearing assembly 180b may be configured to position the unidirectional bearing 190 at the distance 240 from the end face 232 of the first motor 130, as shown in the illustrated embodiment of FIG. 18. Accordingly, the unidirectional bearing 190 may be supported by the feature 242, thereby blocking translational movement of the unidirectional bearing 190 along the shaft 136 in the second direction 168.

Technical effects of the bearing assembly 180 include a reduction in backflow of air through the first passage 126 during non-operational periods of the first condenser fan 110. Specifically, by blocking reverse rotation of the inactive first condenser fan 110 in the clockwise direction 170, the bearing assembly 180 may enable the stationary fan blades 150 of the first condenser fan 110 to hinder a flow of backflow air through the first passage 126. In addition, the bearing assembly 180 may reduce a restart load on components of the first motor 130 when the first condenser fan 110 receives a command to resume normal operation after a period of inactivity. Further, the bearing assembly 180 may enable the first motor 130 to be a single phase PSC motor, which may be less expensive than typical three phase motors used in conventional condenser fan assemblies. That is, because the bearing assembly 180 blocks rotation of the shaft 134 in the clockwise direction 170, the bearing assembly 180 may ensure that the single phase PSC motor drives the first rotor 144 in the counter-clockwise direction 154 upon restart of the first condenser fan 110. Although the bearing assemblies 180a, 180b have been described as implemented with the first condenser fan 110 in the aforementioned discussion, it should be noted that the bearing assemblies 180a, 180b may alternatively be coupled to the second condenser fan 112, or both the condenser fans 110, 112.

While only certain features and embodiments of the present disclosure have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) unit, comprising:
a condenser coil;
a condenser fan assembly including a first fan and a second fan, wherein the first fan and the second fan are each configured to operate to pull air through the condenser coil;
a motor of the first fan including a housing and a shaft, wherein the motor is configured to operate to rotate the shaft in a first direction;
a unidirectional bearing coupled to the shaft and configured to block rotation of the shaft in a second direction that is opposite the first direction;
a bearing mount supporting the unidirectional bearing and positioning the unidirectional bearing along the shaft; and
a plurality of connection members extending from the bearing mount and coupling the bearing mount to a motor mount configured to couple the motor to the HVAC unit, wherein the bearing mount includes a plurality of passages formed therein, and wherein each connection member of the plurality of connection members extends into and engages with a respective passage of the plurality of passages to couple the bearing mount to the motor mount.

2. The HVAC unit of claim 1, wherein the first fan includes a fan blade coupled to the shaft at a fan blade base, wherein the unidirectional bearing is positioned on the shaft outside of the housing of the motor and offset from the fan blade base, and wherein the unidirectional bearing is spaced apart from an end face of the housing by a gap.

3. The HVAC unit of claim 1, comprising a second unidirectional bearing coupled to a second shaft of the second fan configured to be rotated in the first direction by a second motor, wherein the second unidirectional bearing is coupled to a mounting assembly of the condenser fan assembly and is configured to block rotation of the second shaft in the second direction.

4. The HVAC unit of claim 1, wherein the bearing mount includes an opening defined therein, and wherein the unidirectional bearing is disposed within the opening.

5. The HVAC unit of claim 4, wherein the unidirectional bearing includes an inner ring having an inner keyway and an outer ring having an outer keyway, wherein the inner keyway is configured to engage with a key of the shaft to couple the inner ring to the shaft, and the outer keyway is configured to engage with a protrusion of the bearing mount extending into the opening to couple the outer ring to the bearing mount.

6. The HVAC unit of claim 4, wherein the unidirectional bearing is coupled to the bearing mount via an interference fit between the opening and the unidirectional bearing.

7. The HVAC unit of claim 1, comprising:
a shroud of the condenser fan assembly, wherein the shroud defines an air passage, and wherein the first fan is configured to direct at least a portion of the air through the air passage; and
the motor mount, wherein the motor mount is configured to couple to the shroud.

8. The HVAC unit of claim 7, wherein the housing comprises an end face, wherein the motor mount extends from the end face to the shroud.

9. The HVAC unit of claim 1,
wherein the bearing mount and the unidirectional bearing are positioned apart from an end face of the housing via the plurality of connection members to form a gap extending between the housing and unidirectional bearing.

10. The HVAC unit of claim 1, wherein each connection member of the plurality of connection members includes a tip portion having threads configured to align with corresponding threads formed in the respective passage of the plurality of passages.

11. The HVAC unit of claim 1, wherein the motor is a single phase motor.

* * * * *